March 14, 1950      A. LOWNDES      2,500,763
AUTOMATIC TRANSMISSION
Filed April 24, 1947      3 Sheets-Sheet 1
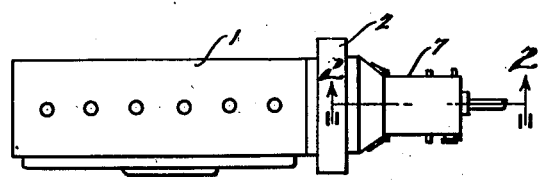
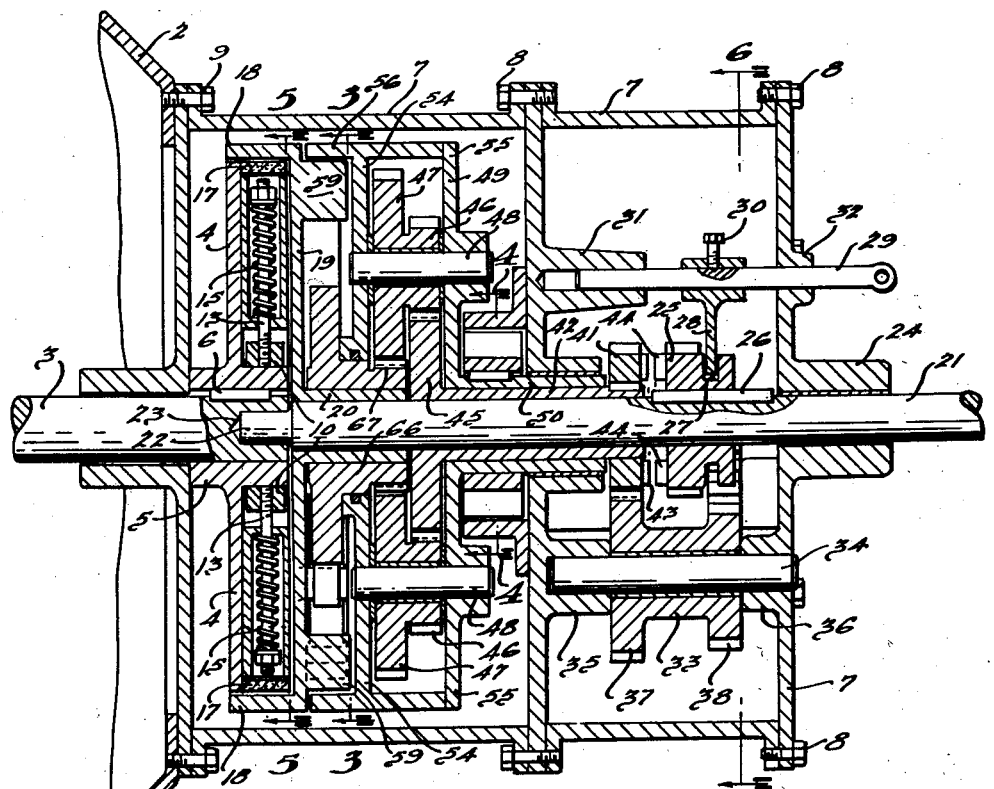
INVENTOR.
Arthur Lowndes.
BY
Barnes, Dickey-Pierce.
ATTORNEYS.

March 14, 1950     A. LOWNDES     2,500,763
AUTOMATIC TRANSMISSION

Filed April 24, 1947     3 Sheets-Sheet 2

INVENTOR.
*Arthur Lowndes.*
BY
*Harness, Dickey & Pierce.*
ATTORNEYS.

INVENTOR.
Arthur Lowndes.
BY
Harness, Dickey & Pierce.
ATTORNEYS.

Patented Mar. 14, 1950

2,500,763

UNITED STATES PATENT OFFICE 2,500,763

AUTOMATIC TRANSMISSION

Arthur Lowndes, Toronto, Ontario, Canada

Application April 24, 1947, Serial No. 743,682

2 Claims. (Cl. 74—751)

This invention relates generally to rotary power transmission constructions. More particularly it relates to that general type of power transmission construction which is primarily designed and intended for establishing and controlling the driving connection between the engine and the driven wheels in conventional automotive vehicles.

The primary object of the present invention is to provide a simple, efficient and compact transmission assembly which unit includes substantially automatic means for changing from one gear ratio to another, and in which said automatic means is controlled by mechanism responsive to not only the speed of the engine but also to the torque required to drive the rear wheels.

Still further, the present invention contemplates the provision of a construction of the general type referred to above which is particularly smooth and efficient in operation and is designed and intended to eliminate jerks and similar undesirable results usually caused by too rapid and positive engagement of the parts.

Yet another advantage of the transmission construction of the present invention resides in the fact that inherently it prevents stalling of the engine irrespective of the loads encountered.

Still further, the invention contemplates the provision of an improved transmission construction which embodies a novel highly effective clutch mechanism for establishing the driving engagement between the driving member and the driven member, which clutch mechanism is substantially automatic in operation and is effective to maintain a positive driving engagement between the parts.

The invention contemplates a transmission construction of the general type referred to above which embodies a system of planetary gearing for establishing a driving relationship between the driving member and the driven member at speeds less than direct drive, and also contemplates the provision of a substantially automatic operating centrifugal clutch construction which serves automatically to lock the planetary gearing and establish a direct driving relationship between the parts when predetermined conditions of engine speed and driving load on the driven wheels have been obtained.

Still further the invention contemplates the provision of a transmission construction in which a centrifugal clutch is provided for automatically changing from a speed less than direct drive to a direct driving relationship and in which means are provided which serve to control the operation of this centrifugal clutch in such a manner that when the engine speed increases to a predetermined point and the load required to drive the driven wheels decreases to a predetermined point a positive driving relationship directly from the engine to the driven wheels is established through said centrifugal clutch construction.

Many other and further objects, advantages and features of the present invention will become clearly apparent from consideration of the following specification when taken in connection with the accompanying drawings forming a part thereof:

In the drawings:

Figure 1 is a top plan view of a more or less conventional internal combustion engine of the type now commonly used in automotive vehicles, illustrating the same in combination with a transmission embodying the improvements of the present invention mounted in direct connection with said engine.

Fig. 2 is a very much enlarged transverse sectional view taken vertically through the transmission construction substantially along the line 2—2 of Fig. 1, illustrating in detail the internal construction and arrangement of parts of one form of transmission embodying the essential improvements of the present invention.

Figure 3:
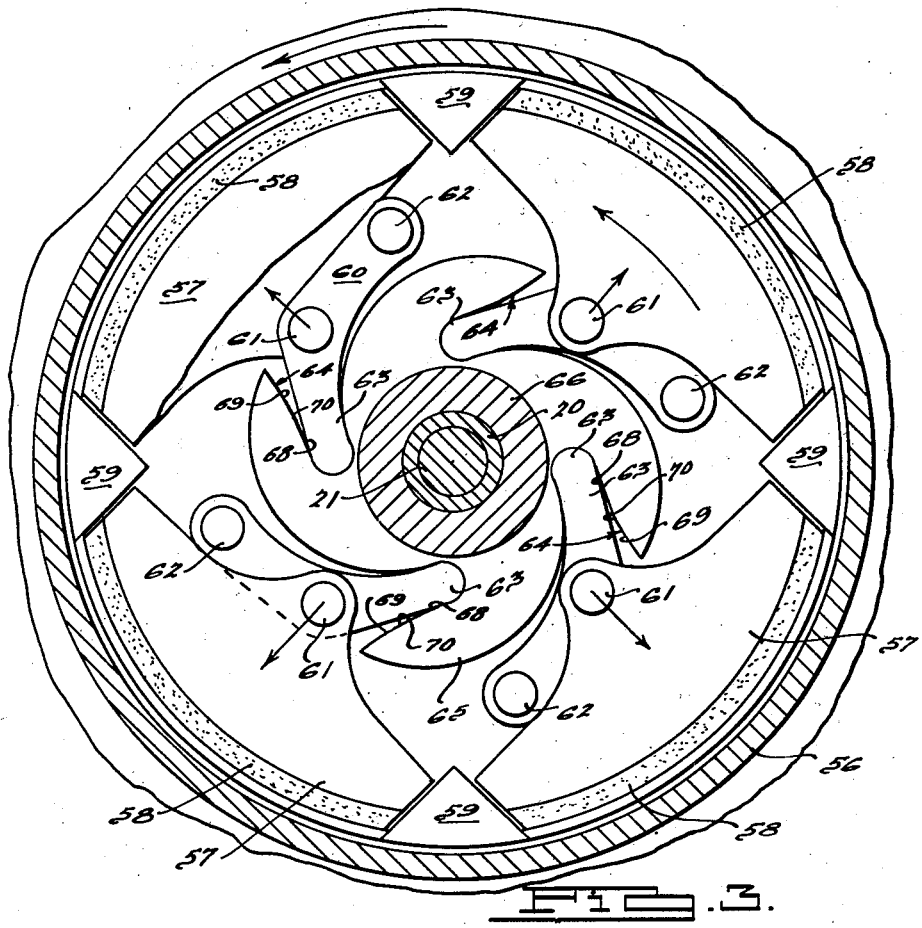
Fig. 3 is a still further enlarged fragmentary cross-sectional view taken along the line 3—3 of Fig. 2 illustrating in elevation one form of the novel and improved centrifugal clutch construction embodied in the transmission for the purpose of changing the gear ratio of the drive between the engine and the driven wheels.

In the specific embodiment of the invention shown in the drawings it will be seen that the improved transmission construction shown therein is illustrated as being of primary utility when attached directly to the driving engine of an automotive vehicle. However, it will be readily appreciated that this transmission construction may find many and various other uses even in fields outside of the automotive field where a transmission construction having the general characteristics of that described below may be found to be useful.

As is shown in Fig. 1 of the drawings, a substantially conventional internal combustion engine 1 has a flywheel housing 2 formed integrally with the rear portion thereof, which flywheel housing also includes a generally frusto-conical clutch housing which may serve to house not only the flywheel of the engine but also a pedal operated clutch (not shown), of the general type commonly used in connection with the automotive vehicular drives.

As will become more clear hereinafter, the improved transmission construction of the present invention is sufficiently complete within itself to eliminate the necessity of the conventional pedal-operated clutch construction commonly used in automotive vehicles; however, it will be understood that such clutch construction may be used in connection with the improved transmission construction of the present invention if desired.

Extending rearwardly from the flywheel and clutch housing is a drive shaft 3, which shaft is driven directly by the engine 1 and which constitutes the power input shaft of the transmission construction hereinafter described. This shaft 3 has a generally circular disk-like member 4 radially extending from a hub 5, which hub 5 is keyed to the rear end of the shaft 3 by means of a conventional key 6 so that this disk-like member 4 will be rotatably driven with the shaft 3 as the shaft 3 is rotated by the engine 1. The entire transmission construction is enclosed within a housing generally designated as 7 which may be of any suitable construction and which in the form shown is generally cylindrical in shape and formed of composite construction having a plurality of parts removably secured together by means of bolts 8.

This housing assembly 7, as a whole, is secured in fixed relation to the clutch and flywheel housing 2 by means of an annular series of cap screws 9 which serve to anchor the housing 7 to the flywheel and clutch housing as a substantially unitary part thereof.

Figure 5:
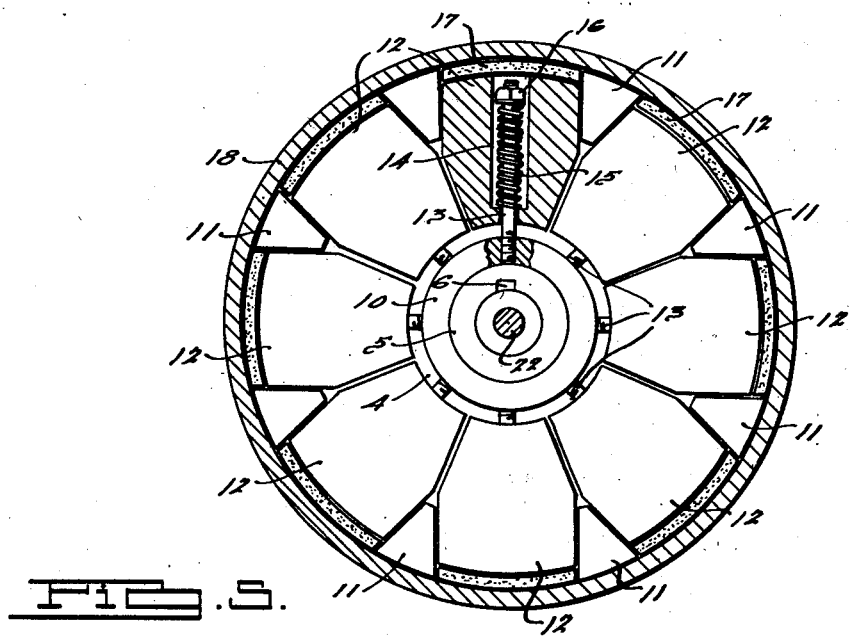
Fig. 5 is a fragmentary transverse cross-sectional view taken substantially along the line 5—5 of Fig. 2 illustrating the interior construction and arrangement of the centrifugal clutch which serves to establish the primary driving connection between the engine and transmission mechanism.
Figure 6:
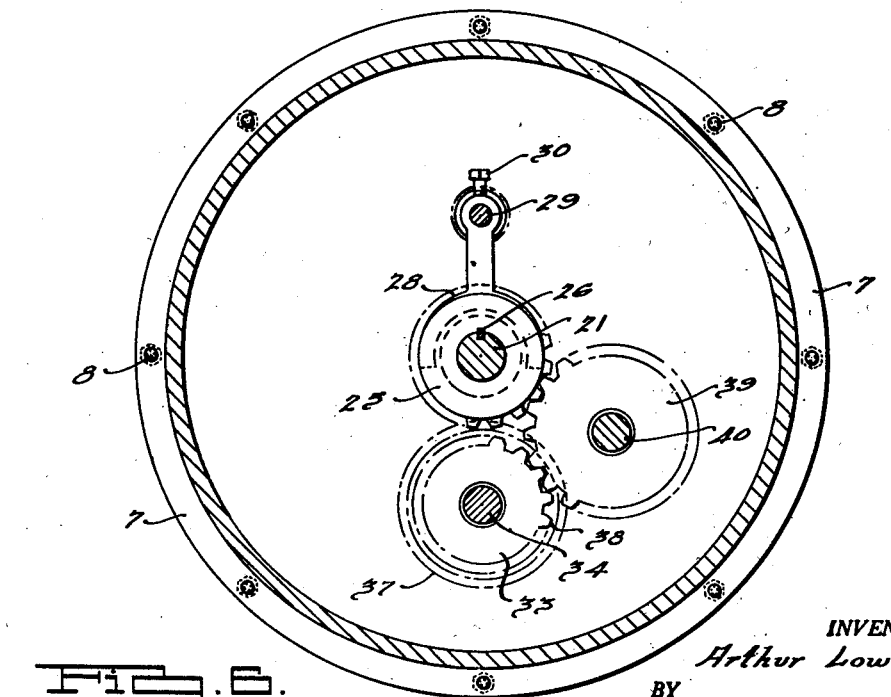
Fig. 6 is a fragmentary transverse cross-sectional view taken substantially along the line 6—6 of Fig. 2 illustrating the mounting and arrangement of the countershaft which serves to provide means by which the transmission can be manually shifted from drive in a forward direction to drive in a reverse direction.

The disk-like member 4 described above serves only as a closure and guide member for the primary centrifugal clutch used to establish the initial driving engagement of the transmission, and the hub 5 of this member extends axially rearwardly along the shaft 3 and is surrounded by an annular ring 10 snugly engaging the hub portion 5 as is clearly seen in Figs. 2 and 5.

The member 4 has on its rear axial face adjacent its periphery a series of generally sector shaped guide members 11 all of which are substantially identical in form and construction. These guide members 11 are seen in Fig. 5 and may be formed as integrally axially extending portions of the disk-like member 4, or may be permanently secured thereto in any suitable manner. These guide members 11 serve to locate and guide centrifugal clutch shoes 12, one of which is mounted for radial movement between each pair of the equally spaced guide members 11.

As will hereinafter be more clearly seen, these clutch shoes 12 are each mounted for relatively limited radial movement and are anchored in position by means of radially extending studs 13, threadably received in the ring member 10 and extending radially therefrom. Each of the clutch shoes has substantially centrally thereof a radially extending counterbore 14 which serves to provide a cavity for receiving the outer ends of the stud members 13 and serves to house compression coil springs 15 surrounding the studs 13. These compression coil springs 15 are compressed and anchored in position by means of nuts 16 threadably received on the outer ends of the studs 13.

Each of the clutch shoes 12 is similarly mounted and it will be readily appreciated that the compression of the coil springs when adjusted in relation to the weight of the clutch members will serve to control the centrifugal force required to force these clutch members outwardly when the shaft 3 is rotated. The peripheral surfaces of the clutch shoes 12 have firmly anchored thereto a suitable section of clutch facing material 17 of the type generally employed in constructions of this general character.

The clutch shoes 12 are adapted for radial engagement with a drum 18 which comprises an axially extending generally cylindrical flange formed on a disk-like web portion 19 which web portion has a hub 20 surrounding and rotatably journaled on the output drive shaft 21 of the transmission construction, which parts are clearly seen in Fig. 2 of the drawings.

This output drive shaft 21 is journaled for rotation at its forward end by means of a reduced diameter portion 22 rotatably received within a cylindrical recess or bearing in the axial rear end of the input shaft 3. The rear wall of the transmission housing 7 is provided with a cylindrical boss 24, which serves to provide a bearing for the shaft 21 at the rear end of the housing, and it will be appreciated by reference to Fig. 2 of the drawings that the input shaft 3 and the output shaft 21 are thus mounted in coaxial alignment with each other. The output shaft 21 is driven by means of a gear 25, drivingly connected thereto by means of a spline key 26 drivingly engaging a corresponding keyway in the gear 25 thereby permitting the gear 25 to be moved a limited distance axially relative to the shaft 21 without disturbing the positive driving engagement between the shaft 21 and the gear 25.

The reverse drive construction described in the following paragraphs is substantially conventional in transmission constructions of this general character and is briefly described herein only in order to provide a complete description of the construction shown.

The gear 25 has a shoulder formed thereon in which an annular recess 27 is provided. This recess serves to receive a fork 28 which is anchored to a shifting shaft 29 by means of a conventional collar and set screw 30. This shifting shaft 29 is axially movable along a line parallel to the axis of the output shaft 21 in a pair of axially aligned bosses 31 and 32 formed in suitable portions of the composite housing construction 7, which parts are seen in Fig. 2 of the drawings.

A cluster gear 33 is journaled for free rotation on a countershaft 34 anchored in suitable bosses 35 and 36 formed in the housing 7. This cluster gear comprises a pair of integrally connected spur gears 37 and 38. The gear 38 of this cluster is adapted to remain in constant meshing engagement with an idler gear 39 mounted for rotation on a second countershaft 40 parallel to the shafts 21 and 34, and the gear 39 is also adapted to mesh with the gear 25 which, as described above, is drivingly connected to the output shaft 21. It will be seen, however, that the driving engagement between the gears 39 and 25 takes place only when the gear 25 is, by means of the fork 28, shifted into an axial position where its teeth are in driving engagement with the teeth of the gear 39.

The other gear of the cluster 37 is in constant meshing engagement with a gear 41 which is keyed to the rear end of a sleeve member 42 journaled for rotation on the output shaft 21, and, as is hereinafter brought out more clearly, this gear 41 is therefore free to rotate coaxially with and around the output shaft 21.

The gear 41 has on its rear axial face a series of clutch teeth 43 which are adapted to engage with a complementary series of clutch teeth 44 on the forward axial face of the gear 25 so that a direct driving engagement between the gears 41 and 25 can be established by moving the shift rod 29 to move the gear 25 to the extreme forward position thereby causing engagement of the clutch teeth 44 with the clutch teeth 43.

The forward end of the sleeve 42 to which the gear 41 is keyed has integrally formed therewith or directly connected thereto a sun gear 45 which is in constant meshing engagement with an annular series of planetary cluster gears, each of which comprises a small diameter gear 46 and a large diameter gear 47 integrally formed as a single unit and each journaled for rotation on a stub shaft 48 carried by a housing 49.

Figure 4:
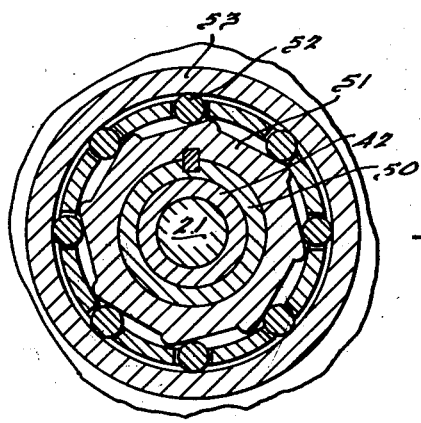
Fig. 4 is a fragmentary transverse cross-sectional view taken along the line 4—4 of Fig. 2 illustrating the internal construction and arrangement of parts of the over-running clutch used for controlling the driving connection between the transmission construction and the driven or output shaft.

The gears 46 of each of these planetary gears are in constant meshing engagement with the sun gear 45. The housing 49 in which they are mounted includes a radially extending web portion anchored to an axially extending sleeve portion 50 journaled for rotation around the sleeve member 42 described above. This sleeve member 50 has keyed thereto the interior portion 51 of a conventional rotary one-way brake or ratchet assembly construction as shown in Figure 4 of the drawings. This comprises an annular series of axially extending rolls 52 housed within a generally cylindrical enclosing housing 53, which general construction and arrangement of parts is best seen in Fig. 4 of the drawings.

The housing 49 includes not only a pair of radial extending walls 54 and 55 but also includes a generally cylindrical axially forwardly extending drum portion 56, best seen in Figs. 2 and 3 of the drawings. This drum portion serves to provide the driven surface of the novel and improved clutch mechanism which is one of the principal features of the present invention.

Referring now to Fig. 3 of the drawings, it will be seen that this improved clutch mechanism comprises a plurality of radially movable shoes 57 having cylindrical portions of clutch facing 58 anchored thereto. It will be seen that as these clutch shoes 57 are moved radially outwardly, the clutch facing 58 thereon will engage the drum 56, and if the pressure with which they engage this drum is sufficient they will establish a positive driving connection therewith. These radial movable clutch shoes 57 are guided by a plurality of generally sector-shaped guide members 59, seen clearly in Figs. 2 and 3 of the drawings, which guide members may be integrally formed with or directly connected to and extending from the rear annular face of the disk member 19 described above.

Each of the clutch shoes 57 has its radial movement controlled by a bell crank arm 60 pivotally connected thereto by means of a pivot pen 61 as is clearly seen in Fig. 3 of the drawings. These pivot pins 61 serve to connect these bell crank arms 60 to the clutch shoe members 57 at a point substantially intermediate the ends of the bell crank arms 60.

The radially outer ends of the bell crank arms 60 are pivotally anchored by means of pins 62 which pins are securely anchored to the axial face of the disk member 19 or even may be an integral part thereof if desired. Each of these bell crank arms 60 has its opposite or free end 63 rounded to provide means for engaging a control cam surface 64. The control cam surfaces 64 are formed on a spider 65 which has a hub portion 66 journaled for rotation around the sleeve 20 to rotate coaxially relative thereto. This hub portion 66 also has, as is clearly seen in Fig. 2, a gear member 67 formed at the rear axial end thereof having a circumferential series of teeth coaxially arranged with respect to the shaft 21, which teeth, as is clearly seen in Fig. 2 of the drawings, are in constant meshing engagement with the teeth of the larger gears 47 of the planetary cluster gears described above.

The exact shape of the cam surfaces and the angle which these cam surfaces have with respect to lines drawn radially from the center of rotation of the shaft 21 is a matter of great importance in determining the characteristics of the unit because, as hereinafter will be more clearly seen, these cam surfaces serve to accurately and precisely control the radial movement of the shoes 57. It will further be more clearly seen when these shoes 57 establish a positive driving engagement with the surrounding drum 56 the gear ratio of the entire transmission construction is changed from a drive of predetermined lower ratio to a drive of one-to-one or direct driving engagement between the input shaft and the output shafts.

As is clearly seen in Fig. 3 of the drawings, it has been found desirable to form the radially interior portions of these cam surfaces at a greater angle with respect to radial lines emanating from the center of the shaft 21 than the angle to which the outer portions of these cam surfaces are formed. Inasmuch as this spider construction, including the cam surfaces 64, serves to provide means for controlling the radial movement of the shoes 57, it is generally regarded as desirable to have this control of a very gradual and precise nature until the clutch shoes 57 are moved radially outward a sufficient distance to establish a substantial but partial driving engagement with the drum 56. It will therefore be seen that the cam surfaces generally designated as 64 comprise an inner portion 68 and an outer portion 69 merging together at the point 70. This point of merger may be a smoothly rounded curve or may in fact be an angular junction of these two cam surfaces largely depending upon the particular characteristics of operation which it is desired to obtain.

Bearing in mind the above described construction of parts, the operation of the device under various conditions of speeds and loads is described below in order that the complete functioning of the apparatus will be clearly understood.

In operation it will be seen that the device functions substantially as follows:

When the motor vehicle in which the construction is mounted is at rest and the motor 1 idling, the shaft 3 will be rotated at the idling speed of the motor. This shaft will, of course, serve to rotate the radially extending disk-like portion 4 keyed thereto and the clutch shoes 12 associated therewith. However, at the idling speed, the springs 15 will retain the shoes 12 in radially retracted position out of contact with the drum 18.

As the speed of the motor is increased, centrifugal force will urge the shoes 12 outwardly against the force of the springs 15, bringing these shoes into frictional engagement with the drum 18 causing at least partial rotation thereof in the same direction as the shaft 3.

The drum 18 has integrally connected to the supporting web thereof the pins 62 which serve to mount and anchor the bell crank member 60 and it will therefore be seen that these members will be rotated causing corresponding rotation of the spider 65 therewith. Because this spider 65 has integrally formed therewith the gear 67 meshing with the planetary cluster gears 47, the gears 47 will be rotated causing rotation of the gear 45, sleeve 42 and gear 41. The overrunning brake assembly above described serves under the conditions described above to arrest rotation of the housing 55, thus assuring the functioning of the planetary gearing in the manner described above.

For drive in a forward direction the shifting rod 29 is moved to the extreme lefthand position, as is viewed in Fig. 2, and the clutch teeth 43 and 44 are engaged with each other to establish a positive driving connection between the gear 41, gear 25 and output shaft 21.

Therefore, it will be seen that as the clutch shoes 12 engage the drum 18 as a result of increasing the speed of the input shaft 3, the output shaft 21 will be driven through the planetary system of gearing in the manner described above. Inasmuch as the gear 46 is considerably smaller in diameter than the gear 47 and inasmuch as the gear 67 is considerably smaller in diameter than the gear 45 in this planetary gearing system, it will be readily appreciated that the input shaft 3 will make several revolutions for each revolution of the output shaft. It will be likewise readily seen that the ratio of the drive when the parts are thus engaged may be determined by properly portioning the relative diameter of these gears in such a manner as to establish the driving ratio desired.

In the present transmission construction it has been found preferable to utilize a gear ratio which will produce approximately four revolutions of the input shaft for each revolution of the output shaft, the same being substantially the same as low gear in a conventional transmission construction.

As the disk-like member 19 which carries the drum 18 is rotated it will be seen that the pins 62 which carry the bell crank arms 60 will be rotated therewith and that the clutch shoes 57 likewise will be rotated. These clutch shoes 57 have substantial weight and as the speed of rotation increases these clutch shoes will be urged outwardly by centrifugal force, depending, of course, upon the speed of rotation. Inasmuch as these clutch shoes 57 are pivotally anchored to the bell crank arms 60 by means of the pins 61, the outward movement of these clutch shoes 57 will be limited and controlled by means of the inner ends 63 of the bell crank members 60 which, as described above, engage the cam surfaces of the spider element 65. The force which causes the inner ends of these bell crank members to engage the spider element 65 is of course controlled by the resistance to rotation offered by the output shaft 21. It will be seen that, because of the shape of the cam surfaces 68, the bell crank arms 60 are forced radially inwardly by means of the resistance of the output shaft 21 to turning movements. As the speed of rotation of the member 19 increases, the centrifugal force exerted on the shoes 57 will correspondingly increase until this centrifugal force is sufficient to at least balance or partially overcome the counteracting force exerted by the cam surfaces 68. When this centrifugal force is sufficiently strong to overcome the oppositely acting force resulting from the action of the cam surfaces 68 the rounded end 63 of each of the bell crank arm members 60 will gradually slide outwardly along the cam surface 68 permitting a correspondingly gradual outward movement of the shoes 57 causing these shoes to frictionally engage the drum 56 causing rotation thereof as a result of such frictional engagement. It will be seen that when the drum 56 is engaged by these shoes and rotated thereby the housing 49 will have a corresponding rotational movement imparted thereto. As the engagement of these shoes 57 with the drum 56 reaches a point where a positive engagement is obtained the drum 56 and shoes 57 will rotate as a unit. It will be seen that these members rotating together will cause a corresponding rotation of the shaft 42 at a speed exactly the same as the rotation of the input shaft 3, thereby eliminating the gear reduction provided by the planetary gearing, and providing a direct drive through the transmission system.

It will be likewise readily appreciated that when the load to be driven, that is the rear wheels of the vehicle, imposes a resistance greater than a predetermined minimum or, conversely, when the speed of the engine and consequent speed of the vehicle is reduced a predetermined amount, the force exerted by the cam members 68 and 69 will exceed the centrifugal force exerted by the clutch shoes 57 and the positive driving engagement between the shoes 57 and the drum 56 will be broken and slippage permitted.

As such slippage takes place the actual ratio of rotation between the input shaft and the output shaft will then be partially transferred to the planetary drive described above at a gear ratio something less than direct drive.

It will be noted that the cam surfaces 68 and 69 may be of many and various forms, depending upon the particular characteristics which it is desired that the transmission construction shall have. The particular angles at which these cam surfaces are located with respect to radial lines passing through the axis of rotation must of necessity bear a direct relationship to the mass of the clutch shoes 57 and the distance of this center of mass from the axis of rotation.

As has been described above, it has been found desirable to provide these cam surfaces at different angles so that when radial movement of the shoes has taken place to a predetermined extent the angle of the cam surface will decrease in order to permit the shoes to effect a positive driving engagement with the drum 56. The difference in angle of the two surfaces making up the whole cam surface should be very slight in order to eliminate possible jerking movements resulting from a too abrupt change in shift of gear ratios.

It will be readily appreciated that the relative angle of the two surfaces making up each of the cam elements is very important in providing the precisely desired characteristics. This angle will prevent unnecessary and too frequent engagement and disengagement of the shoes 58 and will generally contribute to more reliable and stable operation thereof.

As will readily be seen, the over-running brake or ratchet assembly shown in Fig. 4 of the drawings will not necessarily function at all times, and in fact, will serve no useful purpose when the shoes 57 are tightly engaged with the drum 56. However, this brake is essential to prevent rotation of the drum 56 in a reverse direction when the shoes are not in driving engagement therewith.

It will be seen that the construction and arrangement of the planetary gearing is such that in absence of a device of this character it would be possible for the planetary gearing to cease reverse rotation of the drum 56 at a speed sufficient to prevent any torque being transmitted by this gearing to the output shaft.

It will be readily appreciated that the above described construction is merely illustrative of the one embodiment of the invention which includes the improvement herein described and claimed. Many other and further modifications thereof, falling within the scope of the invention as defined in the subjoined claims, will be clearly apparent to those skilled in the art.

What is claimed is:

1. A transmission construction including in combination, a housing having an input shaft extending therefrom on one side and an output shaft coaxially arranged with respect to and journaled within the adjacent end of said input shaft, said output shaft extending substantially entirely through said housing, a radially extending web member keyed to said input shaft, a plurality of radially movable clutch shoes carried by said web member, said shoes movable due to the centrifugal force imparted by rotation of the input shaft, a sleeve member surrounding said output shaft and rotatable independently thereof, a second radially extending web member fixed to said sleeve and located adjacent said clutch shoes, said second web member having an axially extending cylindrical drum portion engageable by said radially movable shoes, a plurality of bellcrank arms, each pivotally connected at one end to said second web member, a second plurality of radially movable shoes, one of said second mentioned shoes being associated with each of said bellcrank arms, a pin pivotally connecting each of said second mentioned shoes with its associated bellcrank arm adjacent the mid-point of said arm, each of said arms having a free end projecting generally angularly inwardly toward the axis of rotation of said second web, a spider member rotatably mounted on said sleeve, said spider member having a plurality of cam surfaces, each of said surfaces being adapted to engage the free end of each of said bell crank arms, gear means drivingly interconnecting said spider with said output shaft whereby the load on said output shaft may serve to control the radial position of said second-mentioned clutch shoes, said gear means including rotatable means carrying a second drum drivingly connected therewith and adapted to be engaged by said second mentioned shoes.

2. A transmission construction including in combination, a housing having an input shaft extending therefrom on one side and an output shaft coaxially arranged with respect to and journaled within the adjacent end of said input shaft, said output shaft extending substantially entirely through said housing, a radially extending web member keyed to said input shaft, a plurality of radially movable clutch shoes carried by said web member, said shoes movable due to the centrifugal force imparted by rotation of the input shaft, a sleeve member surrounding said output shaft and rotatable independently thereof, a second radially extending web member fixed to said sleeve and located adjacent said clutch shoes, said second web member having an axially extending cylindrical drum portion engageable by said radially movable shoes, a plurality of bellcrank arms, each pivotally connected at one end to said second web member, a second plurality of radially movable shoes, one of said second mentioned shoes being associated with each of said bellcrank arms, a pin pivotally connecting each of said second mentioned shoes with its associated bellcrank arm adjacent the mid-point of said arm, each of said arms having a free end projecting generally angularly inwardly toward the axis of rotation of said second web, a spider member rotatably mounted on said sleeve, said spider member having a plurality of cam surfaces, each of said surfaces being adapted to engage the free end of each of said bellcrank arms, planetary gearing serving to interconnect said spider with said output shaft whereby the load on said output shaft may serve to control the radial position of said shoes, said planetary gear means including rotatable means carrying a second drum drivingly connected therewith and adapted to be engaged by said second-mentioned shoes.

ARTHUR LOWNDES.

REFERENCES CITED

The following references are of record in the file of this patent:

UNITED STATES PATENTS

| Number | Name | Date |
| --- | --- | --- |
| 1,422,509 | Wheeler | July 11, 1922 |
| 1,849,890 | Rossi | Jan. 17, 1933 |
| 2,045,612 | Padgett | June 30, 1936 |
| 2,115,212 | Padgett | Apr. 26, 1938 |
| 2,124,192 | Hanson | July 19, 1938 |
| 2,339,626 | Duffield | Jan. 18, 1944 |

FOREIGN PATENTS

| Number | Country | Date |
| --- | --- | --- |
| 78,415 | Sweden | June 4, 1931 |